(12) United States Patent
Hikima

(10) Patent No.: US 6,639,882 B2
(45) Date of Patent: Oct. 28, 2003

(54) PRE-PIT DETECTING APPARATUS

(75) Inventor: Hiroshi Hikima, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/045,041

(22) Filed: Jan. 15, 2002

(65) Prior Publication Data

US 2002/0105870 A1 Aug. 8, 2002

(30) Foreign Application Priority Data

Jan. 15, 2001 (JP) ........................................ 2001-006569

(51) Int. Cl.[7] ................................................. G11B 7/00
(52) U.S. Cl. ................. 369/47.1; 369/47.25; 369/44.36
(58) Field of Search .......................... 369/47.1, 44.36, 369/44.29, 44.34, 44.35, 44.41, 47.25

(56) References Cited

U.S. PATENT DOCUMENTS 6,545,972 B1 * 7/2000 Masahiro et al. .......... 369/47.1
6,337,838 B1   1/2002 Hikima et al.

FOREIGN PATENT DOCUMENTS

EP  0 623 921 A1   11/1994
JP  2000195058      7/2000

* cited by examiner

*Primary Examiner*—Nabil Hindi
(74) *Attorney, Agent, or Firm*—Young & Thompson

(57) ABSTRACT

When first and second read signals generated on the basis of the outputs of electrical signals from a light receiving portion are input to an amplitude correcting circuit, the first and second read signals are added to generate an addition signal. Then the amplitudes of the first and second read signals are corrected for the each RF signal component corresponding to each recording pit, which is contained in the first and second read signals on the basis of the addition signal. Finally, the difference between the first and second read signals is computed to generate a difference signal so that a pre-pit signal will be detected on the basis of the difference signal.

6 Claims, 11 Drawing Sheets

PRE-PIT DETECTING APPARATUS

BACKGROUND OF THE INVENTION

1. Field of the Invention

The present invention relates to the technical field of pre-pit detection apparatus for detecting pre-pits as pre-information, formed on a high-density recording medium such as a DVD-R (DVD-Recordable) or DVD-RW (DVD-Rerecordable), at the time of recording record information.

2. Description of the Related Art

In general, address information and reference signals for generating clock signals for use in recording and reproducing operations are pre-recorded on a recordable type optical recording medium in the form of pre-pits and pre-grooves in order to make it possible to record information on the medium. For example, on a DVD-R (Digital Versatile Disc-Recordable), pre-grooves as regions for recording information such as video and audio data intended to be recorded as recording pits are formed, while pre-pits (hereinafter called land pre-pits or LPP) are recorded on land portions each of which is formed between the pre-grooves.

In the operation of a pre-pit detecting device, reflected light of a light beam irradiated to a pre-groove is received at a light-receiving portion, which is divided into two parts by a division line at least optically parallel with a tangential direction of the pre-groove. As a result, first and second read signals are generated on the basis of the outputs of electrical signals from the light receiving portion, and the difference therebetween is computed to generate a difference signal (hereinafter called a "radial push-pull signal"). Then the radial push-pull signal is compared with a threshold by means of an LPP-signal binarizing circuit to obtain a signal extracted as a binary signal (hereinafter called an LPP signal).

In a conventional pre-pit detecting device, an AGC (Auto Gain Control) circuit makes the amplitudes of the first and second read signals coincide before generation of the above-mentioned radial push-pull signal. This configuration allows an RF component as a noise component to be effectively eliminated to increase LPP signal extraction performance even in extracting an LPP signal from the recorded DVD-R.

However, upon irradiating a high-power light beam for forming recording pits carrying information on a recordable type optical recording medium such as the above-mentioned DVD-R, thermal energy of the recording beam generally reduces the reflectivity at the irradiated position. In other words, the amount of reflected light at the position of a pre-groove on which a recording pit is formed (to which the recording beam has been irradiated) becomes smaller than the amount of reflected light at the position of a pre-groove on which no recording pit is formed.

On the other hand, upon recording information, the recording beam is irradiated to the overall or part of a land portion having an LPP existing therein and adjacent to the position of the pre-groove on which the recording pit carrying information is formed, which may form a recording pit there. In such a case, the reflectivity of the land portion in which the LPP exists is reduced, which may in turn reduce the amplitude level of the LPP signal component contained in the first and second read signals.

For example, FIG. 11 is an imaginary illustration showing the relationship between recording pit positions and waveforms of an LPP signal. FIG. 11A shows a case where a mark portion of the recording pit is overlapped on the overall LPP in the land portion. In this case, the amplitude level of the LPP signal component (solid-line portion) as a whole drops compared to the LPP signal component on which no recording pit is overlapped (broken-line portion).

FIGS. 11B and 11C show cases where the mark portion of the recording pit is overlapped on part of the LPP in the land portion. In these cases, the amplitude level of the LPP signal component (solid-line portion) drops only in the portion on which the recording pit is overlapped, compared to the LPP signal component (broken-line portion) on which no recording pit is overlapped.

On the other hand, since the above-mentioned AGC circuit uses average values of the above-mentioned read signal measured for a long time (about 10 ms) to perform AGC, it cannot correct the amplitude of a signal like the LPP signal component whose cycle is relatively short (about 100 to 500 ns). In other words, the conventional pre-pit detecting device has the above-mentioned AGC circuit insufficient to correct the amplitude of the LPP signal component whose amplitude level has dropped.

As a result, the conventional pre-pit detecting device cannot make clear the difference between the amplitude level of the LPP signal component and the amplitude level of a noise signal component remaining after generation of the radial push-pull signal, which causes a degradation in LPP signal extraction performance.

SUMMARY OF THE INVNETION

The present invention has been made in view of the above-mentioned problems, and it is an object thereof to provide a pre-pit detecting apparatus capable of correcting the amplitude of an LPP signal component contained in an RF component in a short time, and hence improving LPP signal extraction performance.

The above object of the present invention can be achieved by a pre-pit detecting apparatus of the present invention for an optical recording medium, which has information tracks with recording pits carrying record information formed thereon and guide tracks for guiding a light beam to the information tracks, and further has pre-pits carrying pre-information formed on the guide tracks. The pre-pit detecting apparatus including an amplitude correcting circuit, which when the optical beam is irradiated to one of the information tracks, corrects the amplitude of a first read signal and the amplitude of a second read signal generated on the basis of the outputs of electrical signals from a light receiving unit, divided into two parts by a division line at least optically parallel with the information track, such that the pre-pit detecting apparatus performs a computation on the difference between the corrected first and second read signals to generate a difference signal so as to detect a pre-pit signal on the basis of the difference signal. Further, said amplitude correcting circuit is provided with: an addition signal generating device for adding the first read signal to the second read signal to generate an addition signal; a first amplitude correcting device for correcting the amplitude of the first read signal, on the basis of the generated addition signal, for an RF signal component corresponding to a recording pit, which is contained in the first read signal; and a second amplitude correcting device for correcting the amplitude of the second read signal, on the basis of the generated addition signal, for an RF signal component corresponding to a recording pit, which is contained in the second read signal.

According to the present invention, the first and second read signals generated on the basis of the outputs of electrical signals from the light receiving portion are input to the amplitude correcting circuit in which the first and second read signals are added to generate the addition signal. The amplitudes of the first and second read signals are corrected, on the basis of the addition signal, for an RF signal component corresponding to a recording pit, which is contained in the first and second read signals. Then the difference between the first and second read signals corrected is computed to generate a difference signal so that a pre-pit signal will be detected on the basis of the difference signal.

Therefore, in the case of a recorded optical recording medium and even when the amplitude of the pre-pit signal component drops because of the decreased reflectivity of the pre-pit portion, the amplitude level can be corrected in a short time. Since the amplitude of the pre-pit signal can be corrected accurately, the difference between the amplitude level of the pre-pit signal component and the amplitude level of a noise signal component remaining after generation of the difference signal can be made clear, which makes it possible to improve pre-pit signal extraction performance. In addition, the circuit structure is simple, which can reduce manufacturing costs and the like.

In one aspect of the present invention, said first amplitude correcting device makes such a correction that the amplitude of the first read signal is momentarily amplified, on the basis of the generated addition signal, for an RF signal component corresponding to a recording pit, which is contained in the first read signal, and said second amplitude correcting device makes such a correction that the amplitude of the second read signal is momentarily amplified, on the basis of the generated addition signal, for an RF signal component corresponding to a recording pit, which is contained in the second read signal.

According to this aspect, in the case of a recorded optical recording medium and even when the amplitude of the pre-pit signal component drops because of the decreased reflectivity of the pre-pit portion, since the amplitude level can be momentarily amplified and corrected, the difference between the amplitude level of the pre-pit signal component and the amplitude level of a noise signal component remaining after generation of the difference signal can be made clear, which makes it possible to improve pre-pit signal extraction performance. In addition, the circuit structure is simple, which can reduce manufacturing costs and the like.

In another aspect of the present invention, said amplitude correcting circuit is further provided with an offset adjusting device that makes the neutral points of the first and second amplitude correcting devices coincide with each other.

According to this aspect, the pre-pit signal extraction performance can be improved more than the above mentioned invention.

In further aspect of the present invention, said amplitude correcting circuit is further provided with an addition-signal amplitude fluctuation-correcting device that corrects fluctuations in amplitude of the addition signal on the basis of whether the pit length of a recording pit carried with the addition signal is long or short.

According to this aspect, the fluctuations in amplitude of the addition signal can be corrected, which makes possible effective correction of the amplitude levels of the first and second read signals.

In further aspect of the present invention, said amplitude correcting circuit is further provided with: a first read signal delaying device that corrects phase shift between the addition signal and the first read signal, the phase shift produced as a result of correcting the fluctuations in amplitude of the addition signal by said addition-signal amplitude fluctuation-correcting device; and said second read signal delaying device that corrects phase shift between the addition signal and the second read signal, the phase shift produced as a result of correcting means correcting the fluctuations in amplitude of the addition signal by said addition-signal amplitude fluctuation-correcting device.

According to this aspect, even if phase shift is produced as a result of correction of the fluctuations in amplitude of the addition signal, the addition signal can be synchronized with the first read signal and the second read signal, respectively.

In further aspect of the present invention, aid amplitude correcting circuit is further provided with an addition-signal nonlinear amplification device that amplifies the addition signal to make the amplification factor for one polarity of the addition signal larger than the amplification factor for the other polarity.

According to this aspect, the signal-to-noise ratio of the pre-pit signal contained in the radial push-pull signal can be improved.

DESCRIPTION OF THE PREFERRED EMBODIMENTS

The following section will describe preferred embodiments of the present invention with reference to the accompanying drawings. It should be noted that the embodiments to be described below assume a pre-pit detecting device for detecting pre-pits from a DVD-R as a recording medium on which address information indicative of an information recording position on the recording medium and reference signals for generating clock signals for use in recording and reproducing operations are formed as LPPs.

Figure 1:
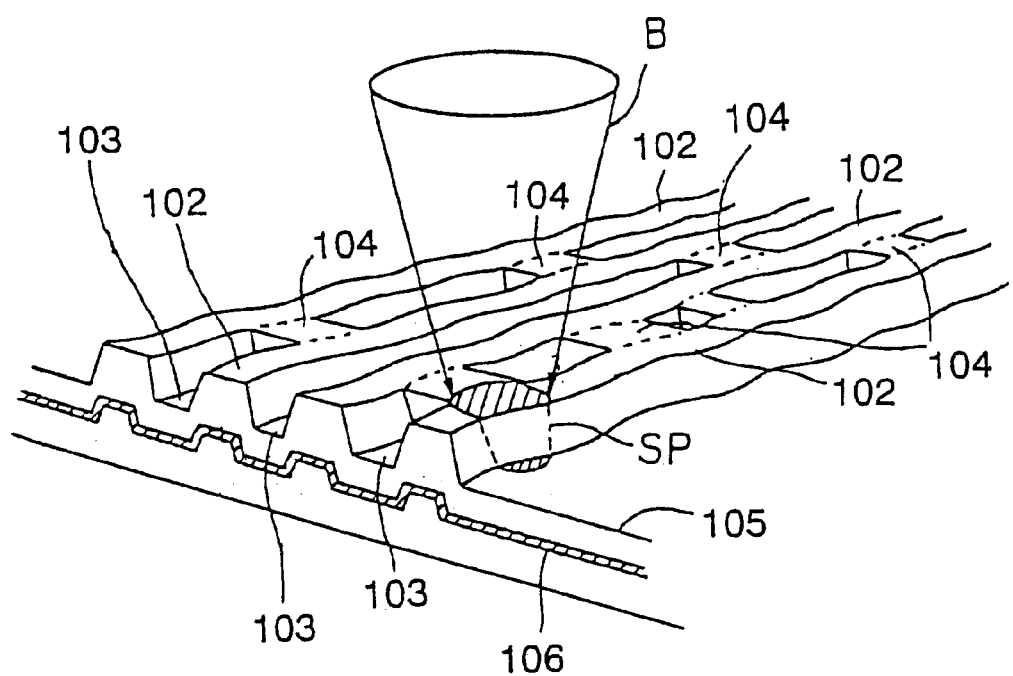
FIG. 1 is a cross-sectional perspective view of a DVD-R 50 according to an embodiment of the present invention.

Referring first to FIG. 1, description will be made about the physical structure of the DVD-R according to an embodiment of the present invention. FIG. 1 is a cross-sectional perspective view of the DVD-R 50 according to the embodiment of the present invention. As shown in FIG. 1, the DVD-R 50 is a pigment type DVD-R which is provided with a pigment film 105 capable of writing information once. Pre-grooves 102 as information tracks on which record information is to be recorded, and lands 103 as guide tracks for guiding a light beam B like a laser beam as reproducing and recording light to the pre-grooves 102 are formed on the DVD-R 50. The DVD-R 50 is also provided with a protective film for protecting the pre-grooves and the lands, and a reflection surface 106 for reflecting the optical beam B at the time of reproduction of record information. Then LPPs 104 are formed on the lands 103.

In the DVD-R 50, the pre-grooves 102 are wobbled at a frequency used as a standard of reference to the rotation speed of the DVD-R 50. Upon recording on the DVD-R 50 record information (information such as image information intended to be recorded other than pre-information and sync signals), the wobbling frequency of the pre-grooves 102 is detected at an information recording apparatus to obtain a sync signal so that the DVD-R 50 will be controlled to rotate at a predetermined speed. At this time, the LPPs 104 are also detected to obtain pre-information beforehand so as to obtain address information and the like indicative of information recording positions on the DVD-R 50. Thus the record information is recorded at a corresponding recording position based on the address information.

In recording the record information, the light beam B is so irradiated that the center of the light beam B will coincide with the center of a corresponding pre-groove 102. As a result, a recording information pit corresponding to the record information is formed on the pre-groove 102 to form the record information. At this time, the size of the light spot SP is so set that the light spot SP is irradiated not only to the pre-groove 102 but partially to the adjacent land 103 as well. Using reflected light of the light spot partially irradiated to the land 103, pre-information is detected from the LPP 104 by a push-pull method to obtain the pre-information. On the other hand, using reflected light of the light spot irradiated to the pre-groove 102, a wobble signal is detected from the pre-groove 102 to obtain a clock signal for rotation control.

Figure 2:
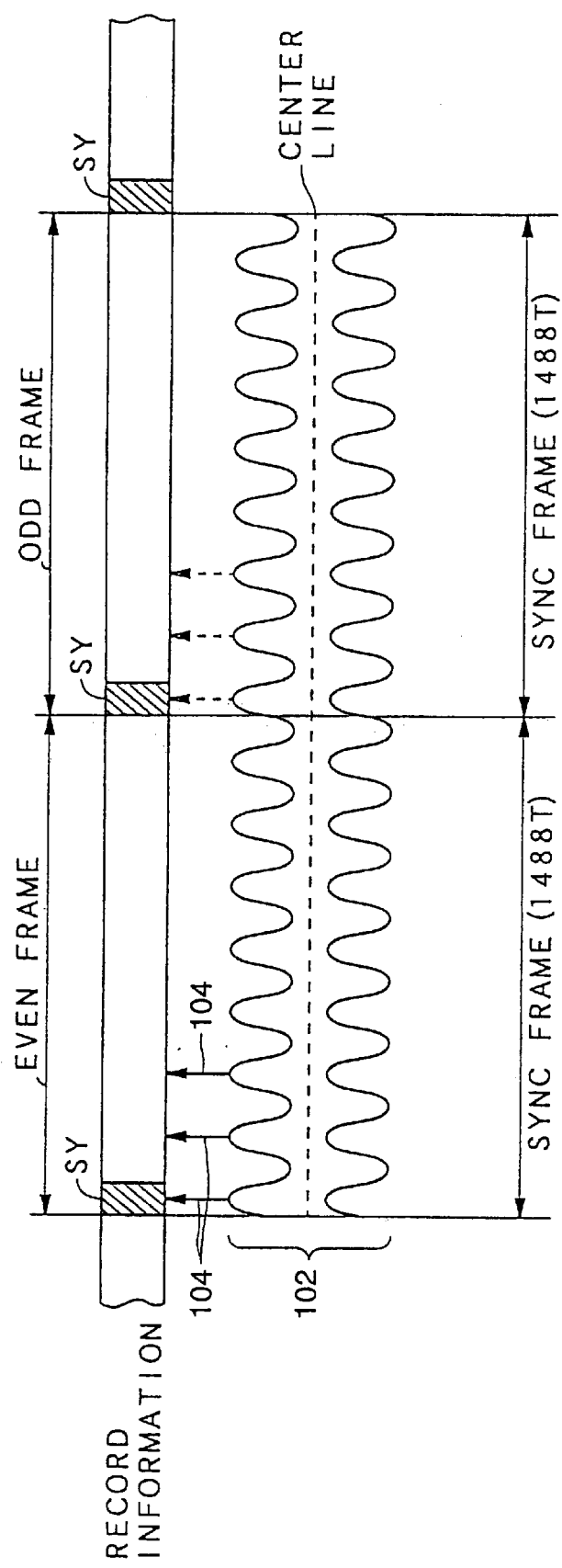
FIG. 2 is a schematic diagram showing a record format of pre-information and rotation control information prerecorded on the DVD-R 50.

Referring next to FIG. 2, description will be made about a record format of the pre-information and rotation control information pre-recorded on the DVD-R 50. It should be noted that the term "pre-recorded" means "pre-formed" as a disk. FIG. 2 is a schematic diagram showing a record format of the pre-information and rotation control information pre-recorded on the DVD-R 50. In FIG. 2, the upper portion shows a record format of the record information, and corrugated waveforms of the lower portion show a wobbling state (a plan view) of the pre-grooves 102 for recording the record information. Further, upward arrows between the record information and the wobbling state of the pre-grooves 102 schematically show positions at which LPPs 104 are formed. It should be noted that in FIG. 2 the wobbling state of the pre-grooves 102 is shown with amplitude greater than actual amplitude for the sake of clarity. Further, the record information is recorded on the centerline of each corresponding pre-groove 102.

As shown in FIG. 2, the record information to be recorded on the DVD-R 50 is divided beforehand on a sync-frame basis. 26 sync frames form one recording sector as an information unit, and 16 recording sectors form one ECC block as an information block. It should be noted that one sync frame has a length 1488 times (1488T) longer than the unit length (hereinafter called T) corresponding to a bit interval defined by the record format for recording the above-mentioned record information. Further, sync information SY for synchronization on a sync-frame basis is recorded in the top 14 T portion of each sync frame.

On the other hand, the pre-information to be recorded on the DVD-R 50 is recorded on a sync-frame basis. In recording the pre-information using the LPPs 104, one LPP 104, as indicating a sync signal in the pre-information, is always formed on the land 103 adjacent to a region in which the sync information SY is recorded for each sync frame of the record information. Meanwhile, one or two LPPs 104 indicative of the contents of the pre-information to be recorded are formed on the land 103 adjacent to the first half of the sync frame containing information other than the sync information SY (or no LPP-104 may be formed with respect to the first half of the sync frame containing information other than the sync information SY, depending on the contents of the pre-information to be recorded). At this time, the LPPs 104 are formed in either even-numbered frames (hereinafter called the "EVEN frames") or odd-numbered frames (hereinafter called the "ODD frames") of each recording sector to record the pre-information. In other words, if the LPPs 104 are formed in the EVEN frames in FIG. 2 (as indicated with the solid upward arrows), no LPPs 104 will be formed in the ODD frames adjacent to the EVEN frames.

The relationship between the wobbling state of the pre-grooves 102 and the LPPs 104 is accounted for by the fact that the LPPs 104 are formed in positions where the amplitude of wobbling becomes the maximum.

On the other hand, the pre-grooves 102 are wobbled all over the sync frames on a constant wobbling frequency, f0 of 140 kHz (at which one sync frame corresponds to a part for eight waves of the fluctuating waveform of the pre-grooves 102). Then the constant wobbling frequency, f0 is detected by a pre-pit detecting device or the like to extract a sync signal for use in controlling the revolution of a spindle motor, not shown, for rotating the DVD-R 50.

Referring next to FIGS. 3 through 7, description will be made about a pre-pit detecting device for detecting pre-pits from the above-mentioned DVD-R 50 according to the present invention. The following description will be made by taking as an example a case where a pre-pit signal is extracted from the recorded DVD-R 50.

Figure 3:
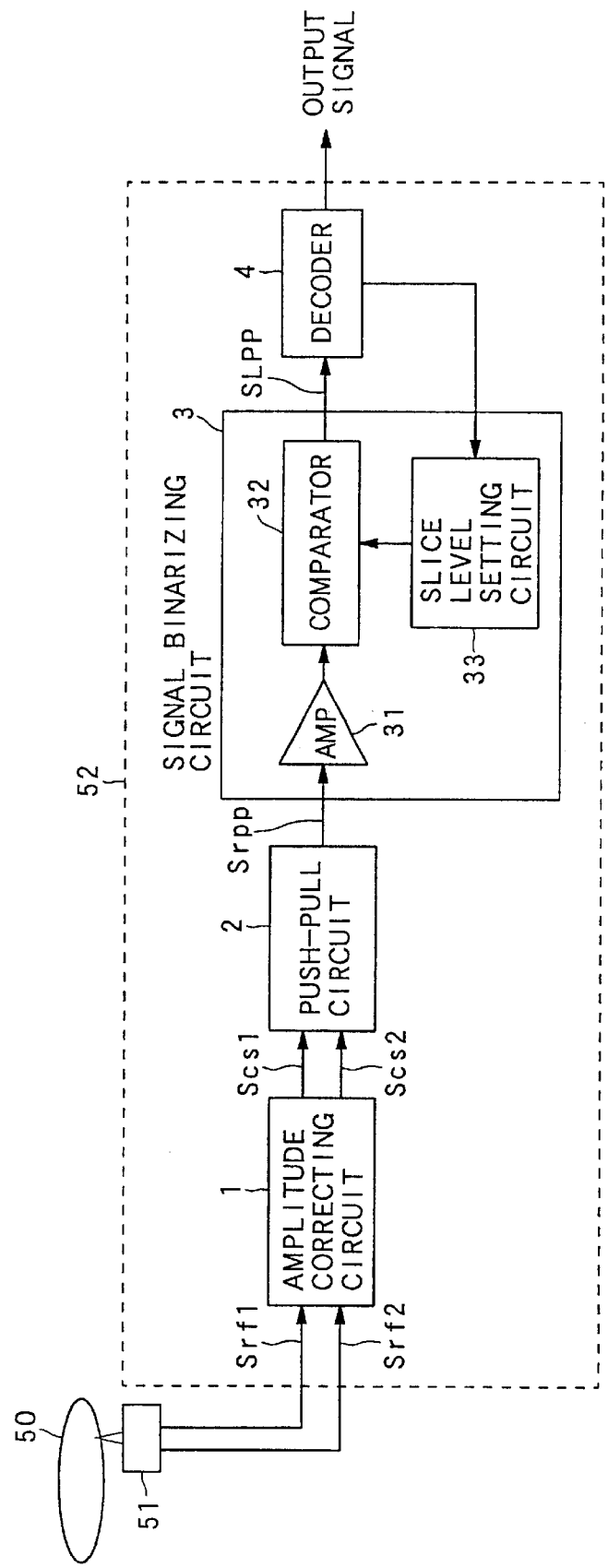
FIG. 3 is a block diagram showing the general structure of a pre-pit detecting device 52 according to the embodiment.

FIG. 3 is a block diagram showing the general structure of a pre-pit detecting device 52 as practiced in the embodiment. It should be noted that the pre-pit detecting device according to the present invention is applied to an information recording and reproducing apparatus for recording media in an actual situation, but description of the structure and operation of apparatus components other than the pre-pit detecting device 52 will be omitted in the embodiment.

As shown in FIG. 3, the pre-pit detecting device 52 includes an amplitude correcting circuit 1, a push-pull circuit 2, a signal binarizing circuit 3 and a decoder 4. In operation, a first read signal Srf1 and a second read signal Srf2 are input from a pickup 51 to the amplitude correcting circuit 1 of the pre-pit detecting device 52. The first read signal Srf1 and the second read signal Srf2 are generated as follows. First, a light beam is irradiated from the pickup 51. Then reflected light from the information recording surface of the DVD-R 50 driven to rotate is received at a light receiving portion, not shown, which is divided into two parts by a division line at least optically parallel with the tangential direction of the pre-grooves 102 on the DVD-R 50. The light receiving portion outputs electrical signals according to the amounts of reflected light received at the light receiving portion, so that the first and second read signals are generated on the basis of the electrical signals.

Figure 4:
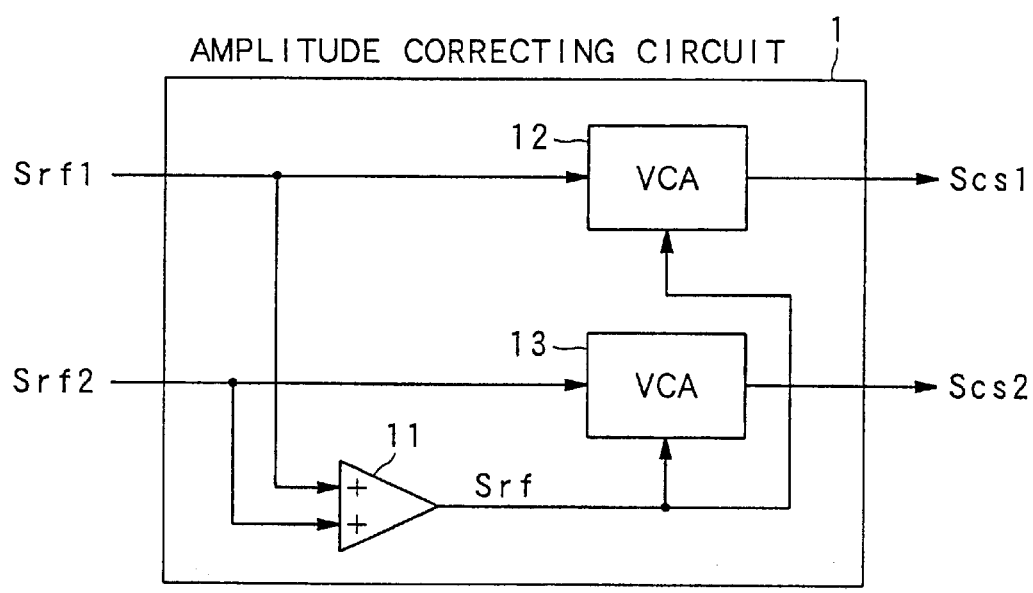
FIG. 4 is a block diagram showing an internal configuration of an amplitude correcting circuit 1.

FIG. 4 is a block diagram showing an internal configuration of the amplitude correcting circuit 1 as characterized by the present invention. As shown in FIG. 4, the amplitude correcting circuit 1 includes an adder 11 as addition signal generating means, a voltage control amplifier (VCA) 12 as first amplitude correcting means, and a voltage control amplifier (VCA) 13 as second amplitude correcting means.

The adder 11 adds the first and second read signals Srf1 and Srf2 supplied from the pickup 51 to supply the same to the voltage control amplifiers 12, 13 as an addition signal (amplification factor-control signal) Srf, respectively.

The voltage control amplifier 12 amplifies and corrects the amplitude of the first read signal Srf1 momentarily (in a short time), for each recording pit of the RF signal component contained in the first read signal Srf1 supplied from the pickup 51, at an amplification factor based on the addition signal Srf supplied from the adder 11. The corrected signal is output to the push-pull circuit 2 as a correction signal Scs1 of the first read signal Srf1.

On the other hand, the voltage control amplifier 13 momentarily amplifies and corrects the amplitude of the second read signal Srf2, for each recording pit of the RF signal component contained in the second read signal Srf2 supplied from the pickup 51, at an amplification factor based on the addition signal Srf supplied from the adder 11. The corrected signal is output to the push-pull circuit 2 as a correction signal Scs2 of the second read signal Srf1.

Figure 5:
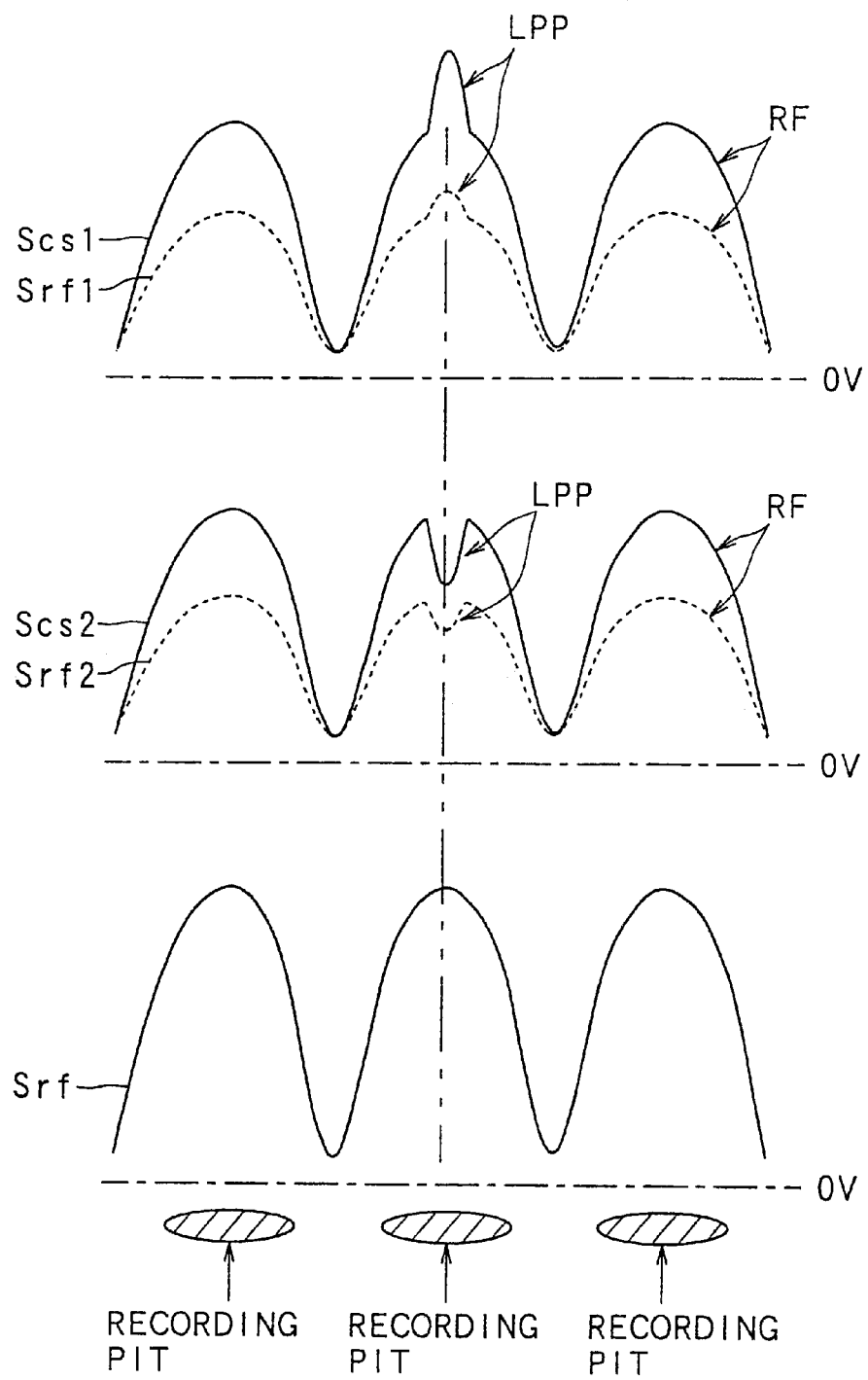
FIG. 5 shows a comparison among waveforms of first and second read signals Srf1 and Srf2 read from the recorded DVD-R 50, waveforms of correction signals Scs1 and Scs2 corrected by means of the amplitude correcting circuit 1, and an addition signal Srf.

The voltage control amplifiers 12, 13 amplify the first and second read signals Srf1 and Srf2, respectively, at an amplification factor which is increased as the amplitude level of the addition signal Srf increases. FIG. 5 shows a comparison among the first and second read signals Sfr1 and Srf2 read from the recorded DVD-R 50, the correction signals Scs1 and Scs2 corrected by means of the amplitude correcting circuit 1, and the addition signal Srf.

As shown in FIG. 5, the amplitude of the first read signal Srf1 (broken-line portion) is momentarily amplified at timing at which the addition signal Srf corresponding to the recording pit is input, and turned into the correction signal Scs1 (solid-line portion). Also, the amplitude of the LPP signal component, which is overlapped with the first read signal Srf1 corresponding to the recording pit, is momentarily amplified. Similarly, the amplitude of the second read signal Srf2 (broken-line portion) is momentarily amplified at timing at which the addition signal Srf corresponding to the recording pit is input, and turned into the correction signal Scs2 (solid-line portion). Also, the amplitude of the LPP signal component, which is overlapped with the second read signal Srf2 corresponding to the recording pit, is momentarily amplified.

In other words, even if the LPP 104 is overlapped with the recording pit and hence the amplitude level of the LPP signal component drops, the amplitude level can be momentarily amplified at a timing which the RF signal component corresponding to the recording pit is input, at an amplification factor based on the amplitude of the addition signal Srf corresponding to the recording pit portion.

Further, since the addition signal Srf is a sum signal of the first and second read signals Srf1 and Srf2, the amplification factor for the amplitude of the first read signal Srf1 can be made equal to the amplification factor for the amplitude of the second read signal Srf2.

Although the amplitudes of the RF signal components are also amplified, since one signal is made opposite in polarity to the other in the push-pull circuit 2 to be described later, the RF signal components identical in polarity are compensated with each other at the time of generation of the radial push-pull signal. As a result, the sum of the LPP signal components, mutually opposite in polarity, of the first and second read signals Srf1 and Srf2 ends up the radial push-pull signal.

Therefore, the difference between the amplitude level of the LPP signal component and the amplitude level of a noise component remaining after generation of the radial push-pull signal can be made clear.

Figure 6:
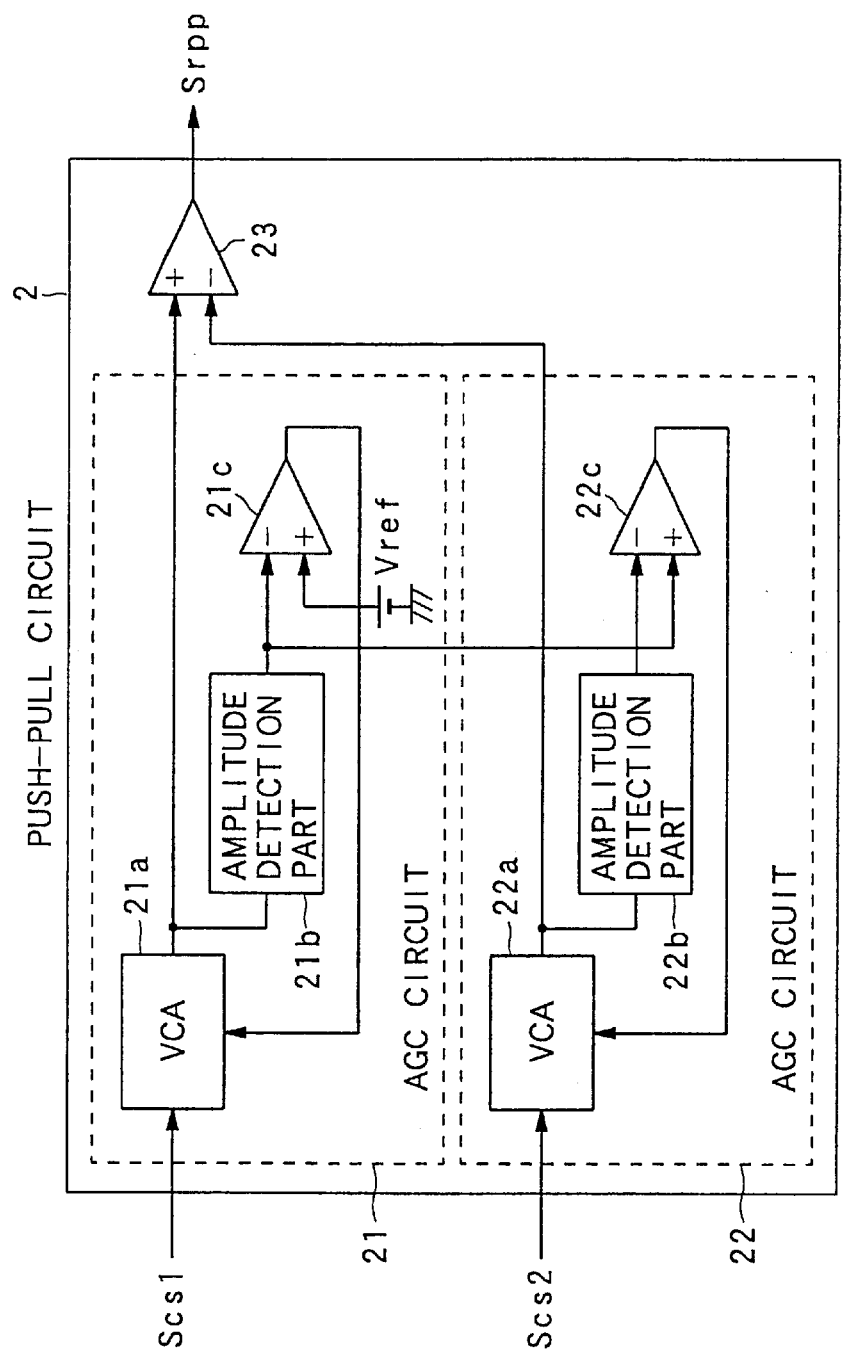
FIG. 6 is a block diagram showing an internal configuration of a push-pull circuit 2.

FIG. 6 is a block diagram showing an internal configuration of the push-pull circuit 2. As shown in FIG. 6, the push-pull circuit 2 includes two AGC (Auto Gain Control) circuits 21 and 22. The AGC circuit 21 is equipped with a voltage control amplifier 21*a*, an amplitude detection part 21*b* and a subtracter 21*c*, and has the function of making the amplitude of a signal, obtained from the correction signal Scs1 from the amplitude correcting circuit 1, coincident with a reference voltage (ref). To be more specific, the voltage control amplifier 21*a* amplifies the correction signal Scs1 at an amplification factor based on the difference between the correction signal Scs1 generated at the subtracter 21*c* and the reference voltage (ref) so that the amplitude of the correction signal Scs1 will be made coincident with the reference voltage (ref). On the other hand, the AGC circuit 22 is equipped with a voltage control amplifier 22*a*, an amplitude detection part 22*b* and a subtracter 22*c*, and has the function of making the amplitude of a signal, obtained from the correction signal Scs2, coincident with the amplitude of the signal obtained from the correction signal Scs1.

Then a subtracter 23 computes the difference between the correction signals Scs1 and Scs2 to cancel the RF signal components, identical in polarity, of the correction signals Scs1 and Scs2. On the other hand, the LPP signal components mutually opposite in polarity are amplified to generate a radial push-pull signal Srpp. The radial push-pull signal Srpp is a composite signal generated by superimposing the LPP signal component on the wobbling frequency component.

Then, as shown in FIG. 3, the signal binarizing circuit 3 includes an amplifier 31, a comparator 32 and a slice level setting circuit 33.

In the signal binarizing circuit 3, an input of the radial push-pull signal Srpp is supplied to the comparator 32 through the amplifier 31. The comparator 32 compares the supplied radial push-pull signal Srpp with a slice level supplied from the slice level setting circuit 33 to extract an LPP signal to be output to the decoder 4.

The slice level setting circuit 33 receives error detection signals detected when the decoder 4 decodes the LPP signal, and counts the number of the error detection signals. Then, when the slice level becomes unsatisfactory for an error rate decided for a predetermined block unit (for example, for each ECC (Error Correction Code) block), the slice level setting circuit 33 resets the slice level.

Figure 7A:
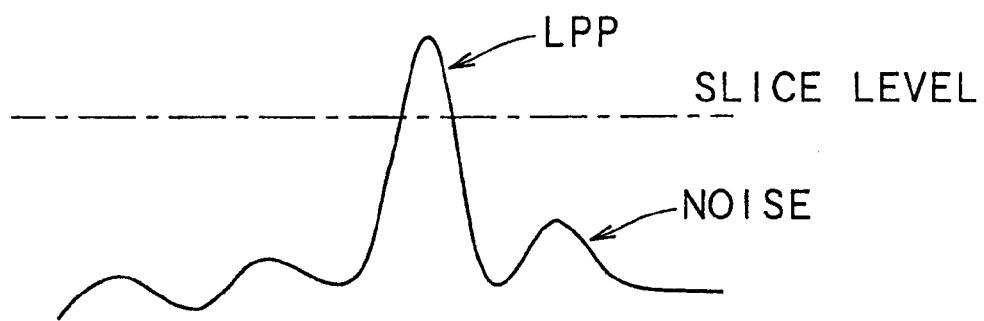
FIG. 7A is a graph showing such a state that a radial push-pull signal Srpp is compared at a comparator in a pre-pit detecting device for the recorded DVD-R 50 according to the present invention.
Figure 7B:
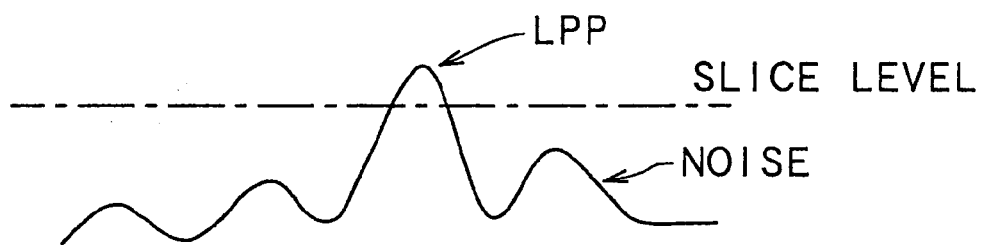
FIG. 7B is a graph showing such a state that the radial push-pull signal Srpp is compared at a comparator in a conventional pre-pit detecting device for the recorded DVD-R 50.

FIG. 7A shows as an example such a state that the radial push-pull signal Srpp is compared at the comparator 32 in the case of the recorded DVD-R 50. FIG. 7B shows as an example such a state that the radial push-pull signal Srpp is compared at a comparator in a conventional pre-pit detecting device (which has no means like the amplitude correcting circuit 1 for correcting the amplitude level of the LPP signal component) in the case of the recorded DVD-R 50.

As shown in FIG. 7B, when the amplitude level of the pre-pit signal component drops because of the decreased reflectivity of the pre-pit portion in the conventional pre-pit detecting device, the amplitude of the LPP signal and the amplitude of a noise component are very close to each other, which makes it difficult to set a slice level. In this case, there is a high possibility that the noise component will be binarized to generate the LPP signal.

On the other hand, as shown in FIG. 7A, even when the amplitude level of the pre-pit signal component drops because of the decreased reflectivity of the pre-pit portion in the pre-pit detecting device 52 according to the present invention, the difference between the amplitudes of the LPP signal component and the noise component can be made clear, which makes it easy to set the slice level, and hence generate an LPP signal from which the noise component is removed to the utmost.

In particular, since an LPP (such as an LPP for generating address information) other than the LPP for generating a sync signal tends to vary its position relative to the recording pit at random, a short-time amplitude correction according to the present invention can be more effective at extracting the LPP such as the LPP for generating address information.

The decoder 4 decodes the LPP signal to generate address information indicative of information recording positions and various timing signals to be output to a system control unit, not shown, which performs control necessary to record information on the DVD-R 50 on the basis of the address information and the timing signals.

As discussed above and according to the embodiment, even if the amplitude level of the pre-pit signal component drops because of overlapping of the recording pit and the LPP 104, the amplitude level can be momentarily amplified and corrected in the recording pit portion of the RF signal component. As a result, the difference between the amplitude level of the pre-pit signal component and the amplitude level of the noise component remaining after generation of the difference signal can be made clear, which makes it possible to improve pre-pit signal extraction performance.

Figure 8:
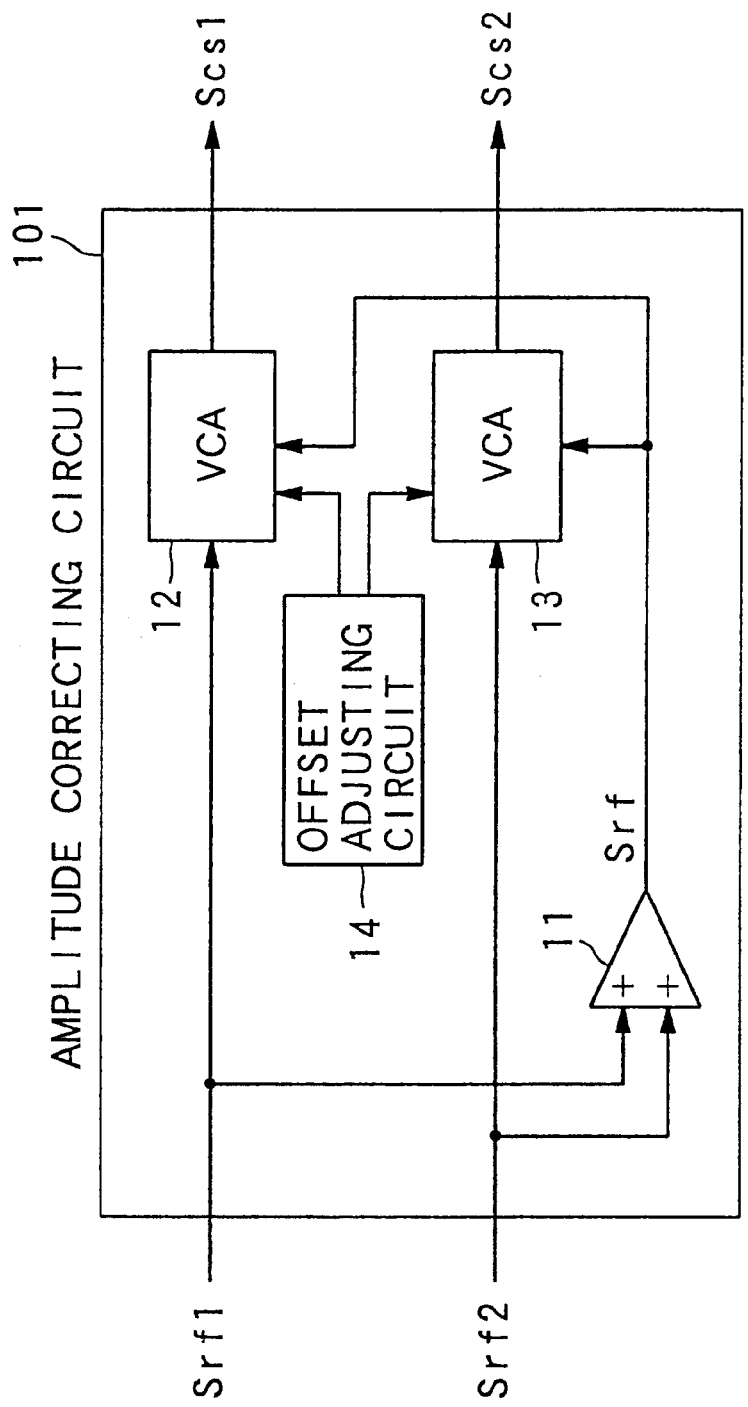
FIG. 8 is a block diagram showing a configuration of an amplitude correcting circuit 1 according to another embodiment of the present invention.

FIG. 8 is a block diagram showing an internal configuration of an amplitude correcting circuit 1 according to another embodiment of the present invention. The amplitude correcting circuit 110 shown in FIG. 8 includes an offset adjusting circuit 14 as offset adjusting means in addition to the amplitude correcting circuit 1 shown in FIG. 4.

The above-mentioned voltage control amplifiers 12 and 13 may vary in neutral point from each other. In such a case, if the voltage level is the same, the amplification factor is difference therebetween, which may cause an degradation in LPP signal extraction performance. To avoid this, the amplitude correcting circuit 110 is provided with the offset adjusting circuit 14, so that both neutral points are made to coincide, thereby improving LPP signal extraction performance more than in the amplitude correcting circuit 1 shown in FIG. 4.

Figure 9:
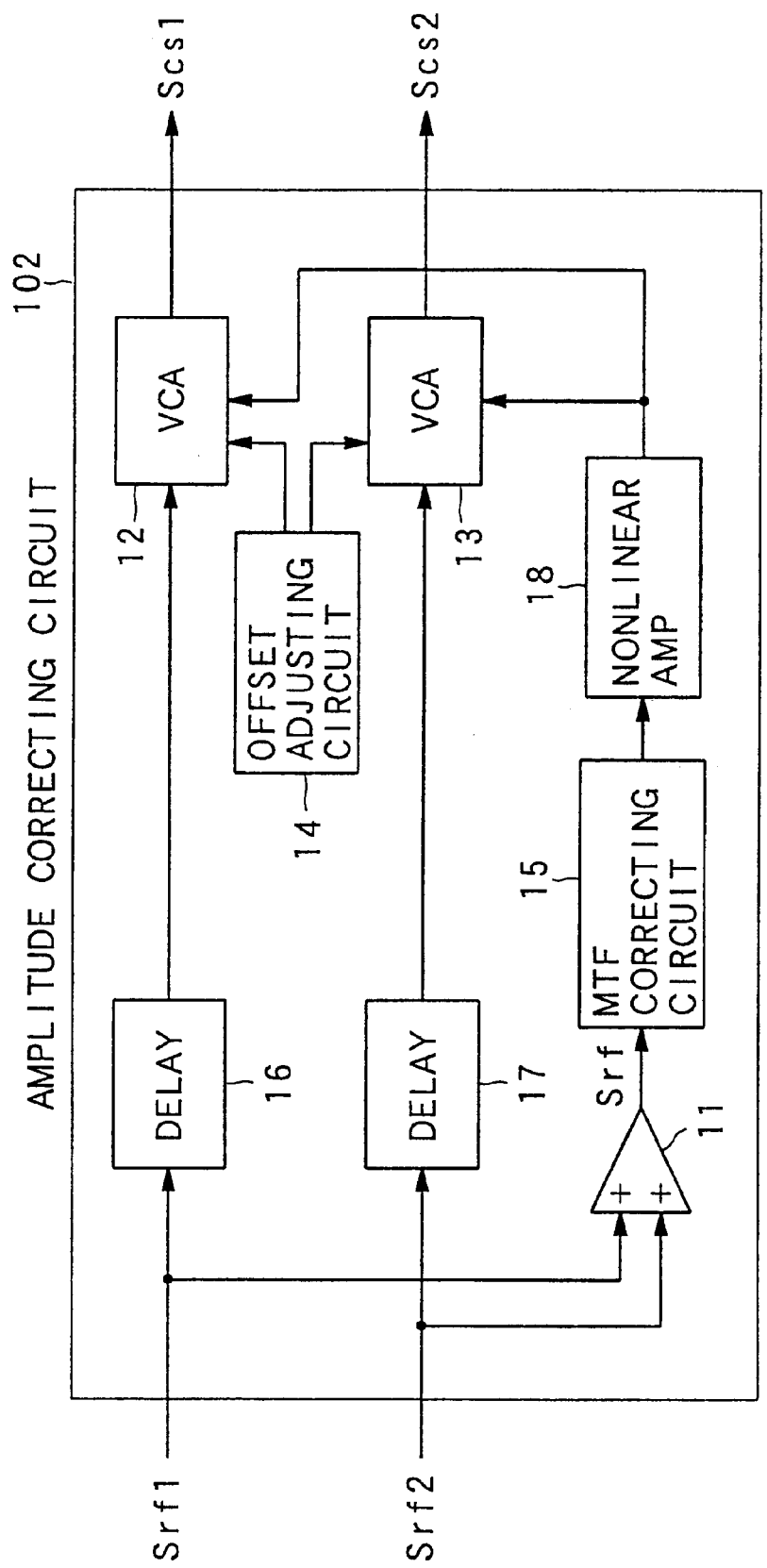
FIG. 9 a block diagram showing a configuration of an amplitude correcting circuit 1 according to still another embodiment of the present invention.

FIG. 9 is a block diagram showing an amplitude correcting circuit 1 according to still another embodiment of the present invention. The amplitude correcting circuit 120 shown in FIG. 9 includes, in addition to the amplitude correcting circuit 1 shown in FIG. 8, an MTF correcting circuit 15 as addition-signal amplitude fluctuation-correcting means, delay circuits 16, 17 as delay means, and a nonlinear amplifier 18 as addition-signal nonlinear amplification means.

The MTF correcting circuit 15 is operative to correct amplitude fluctuations due to variations in pit length of recording pits carried with the addition signal Srf appearing according to the spatial frequency characteristics of the pickup 51. The spatial frequency characteristics are generally low-pass characteristics. In other words, the detection ability of the pickup 51 is reduced as the spatial frequency components of a recording pit to be read increase (as the pit length of the recording pit becomes shorter), which makes the amplitude of the addition signal Srf smaller. Since the length of a recording pit vary according to the information to be recorded, long recording pits and short recording pits (hereinafter called long pits and short pits as required) exist together in the addition signal Srf. Thus the addition signal Srf varies according to the recording pit length.

The MTF correcting circuit 15 is to correct fluctuations in amplitude of the addition signal Srf resulting from variations in pit length of the recording pits. For example, the MTF correcting circuit 15 is constituted by a component such as an HBF (High Boost Filter) capable of increasing the amplification factor as the signal frequency becomes higher. In such a configuration, the amplitude correcting circuit 120 corrects a drop in amplitude of the addition signal Srf because of the short pit so that the amplitude level will rise to a level substantially equivalent to the amplitude level caused by the long pit. Then the corrected amplitude level is output to the nonlinear amplifier 22, which makes is possible to supply an appropriate addition signal Srf to the voltage control amplifiers 12 and 13, respectively.

Correction for fluctuations in amplitude of the addition signal Srf, however, produces phase shift between the addition signal Srf and the first and second read signals Srf1 and Srf2. Therefore, the delay circuits 16, 17 are provided for delaying inputs of the first and second read signals Srf1 and Srf2 for a predetermined time period. In this case, since the time the addition signal Srf passes through the circuit is extended, the first and second read signals Srf1 and Srf2 can be made in phase with each other.

Figure 10:
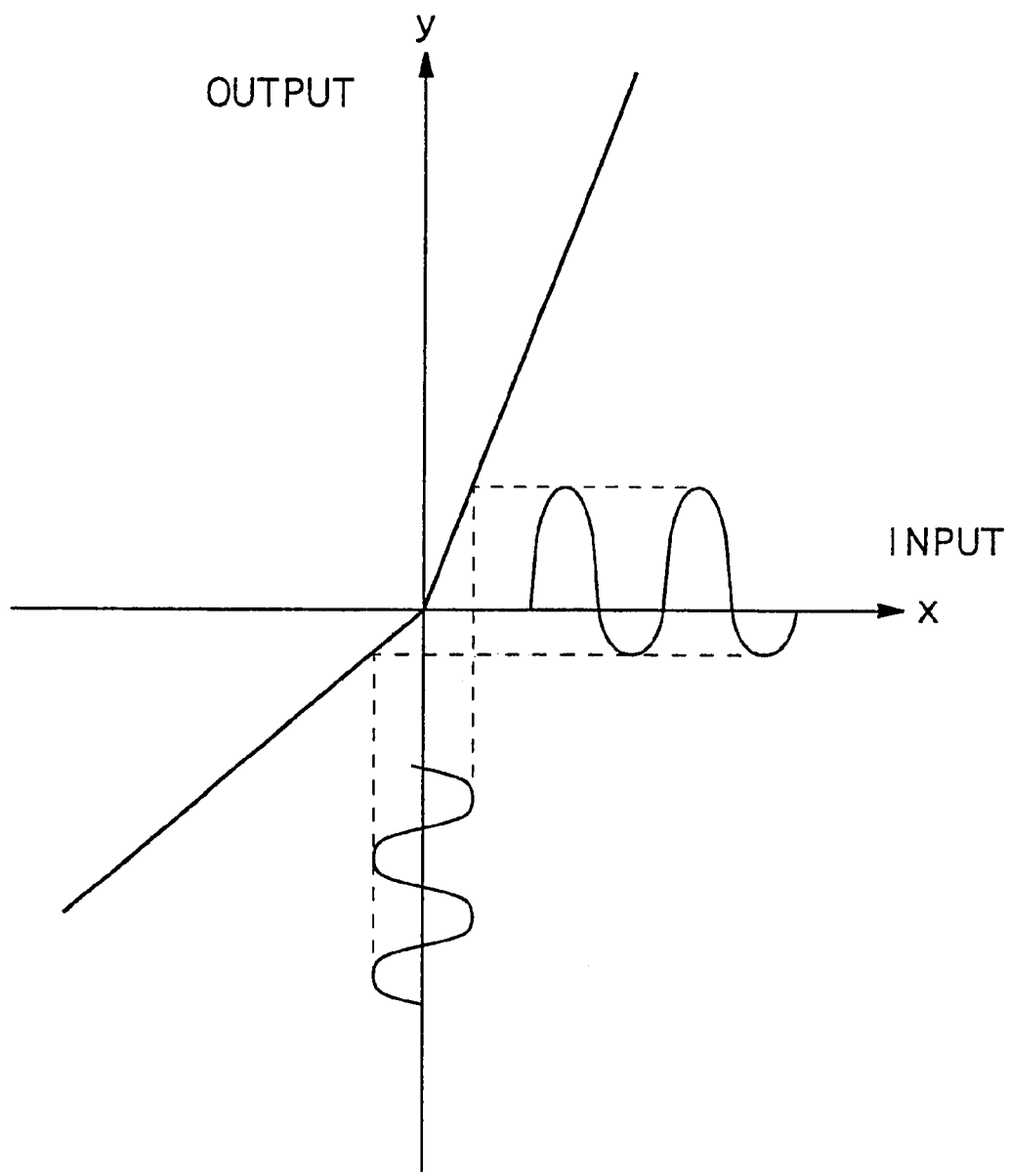
FIG. 10 is a graph showing input and output characteristics of a nonlinear amplifier.
Figure 11A:
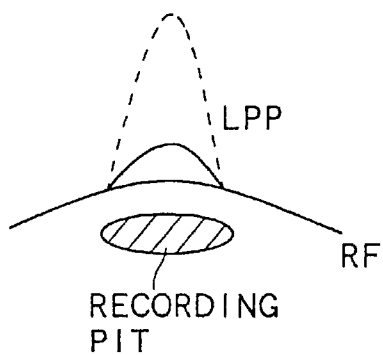
FIG. 11A is an enlarged illustration of an LPP signal portion of a signal read in a conventional pre-pit detecting signal in the case where a mark portion of a recording pit is overlapped on an overall LPP in a land portion.
Figure 11B:
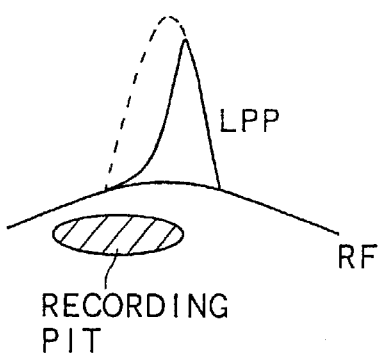
FIG. 11B is an enlarged illustration of an LPP signal portion of a signal read in a conventional pre-pit detecting signal in the case where a mark portion of a recording pit is overlapped on part of an LPP in a land portion.
Figure 11C:
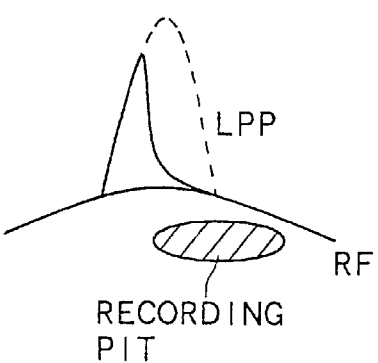
FIG. 11C is an enlarged illustration of an LPP signal portion of a signal read in a conventional pre-pit detecting signal in the case where a mark portion of a recording pit is overlapped on part of an LPP in a land portion.

The nonlinear amplifier 18 also has input and output characteristics exhibiting non-linearity approximating a line chart as shown in FIG. 10. To be more specific, it has such a characteristic that the amplification factor for positive input of an input signal becomes larger than that for negative input of the input signal. Therefore, the signal input to the nonlinear amplifier 18 becomes an output signal whose positive amplitude level is emphasized, which is more effectively at controlling the gains of the VCAs 12 and 13.

In the embodiment, the polarity of the addition signal Srf from the MTF correcting circuit 15, which corresponds to a recording pit formed on the DVD-R 50, is set to become positive. Therefore, the nonlinear amplifier 18 can amplify the addition signal Srf so that the signal level corresponding to the recording pit for the addition signal Srf becomes larger than the signal level that does not correspond to the recording pit, that is, the amplitude becomes greater than that of the negatively polarized portion of the addition signal Srf.

The addition signal Srf thus output from the nonlinear amplifier 18 is output to the voltage control amplifiers 12 and 13 as the amplification factor-control signal. Such a biased emphasis is placed because, when the reflectivity is reduced by forming an LPP 104 on a land adjacent to the recording pit, the signal component of the LPP 104 is contained in the positively polarized side of the first read signal Srf1. Therefore, the positively polarized component of each read signal need to be emphasized, which makes it possible to improve the signal-to-noise ratio of the LPP signal contained in the radial push-pull signal Srpp.

Thus the amplitude correcting circuit 120 shown in FIG. 9 can obtain the effects equivalent to those of the amplitude correcting circuit 110 shown in FIG. 8. However, the amplitude correcting circuit 110 shown in FIG. 4 or 8 is enough to attain the object of the present invention. The amplitude correcting circuit 110 is better than the amplitude correcting circuit 120 in the manufacturing period, the manufacturing costs, the inspection period and the like because of its simple circuit structure.

In the above-embodiments, the DVD-R was taken by way of example to describe the present invention, but the present invention is not limited thereto, and it is applicable to any other recording media such as a DVD-RW and a CD-R.

As described above and according to the present invention, even if the amplitude level of the pre-pit signal component drops because of overlapping of the recording pit and the LPP, the amplitude level can be momentarily amplified and corrected in the recording pit portion of the RF signal component. As a result, the difference between the amplitude level of the LPP signal component and the amplitude level of the noise component remaining after generation of the radial push-pull signal can be made clear, which makes it possible to improve LPP signal extraction performance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-6569 filed on Jan. 15, 2001 including the specification, claims, drawings and summary is incorporated herein by reference in its entirety.

What is claimed is:

1. A pre-pit detecting apparatus for an optical recording medium, which has information tracks with recording pits carrying record information formed thereon and guide tracks for guiding a light beam to the information tracks, and further has pre-pits carrying pre-information formed on the guide tracks, the pre-pit detecting apparatus including an amplitude correcting circuit, which when the optical beam is irradiated to one of the information tracks, corrects the amplitude of a first read signal and the amplitude of a second read signal generated on the basis of the outputs of electrical signals from a light receiving unit, divided into two parts by a division line at least optically parallel with the information track, such that the pre-pit detecting apparatus performs a computation on the difference between the corrected first and second read signals to generate a difference signal so as to detect a pre-pit signal on the basis of the difference signal, wherein said amplitude correcting circuit comprises:
an addition signal generating device for adding the first read signal to the second read signal to generate an addition signal;
a first amplitude correcting device for correcting the amplitude of the first read signal, on the basis of the generated addition signal, for an RF signal component corresponding to a recording pit, which is contained in the first read signal; and
a second amplitude correcting device for correcting the amplitude of the second read signal, on the basis of the generated addition signal, for an RF signal component corresponding to a recording pit, which is contained in the second read signal.

2. The pre-pit detecting apparatus according to claim 1, wherein said first amplitude correcting device makes such a correction that the amplitude of the first read signal is momentarily amplified, on the basis of the generated addition signal, for an RF signal component corresponding to a recording pit, which is contained in the first read signal, and
said second amplitude correcting device makes such a correction that the amplitude of the second read signal is momentarily amplified, on the basis of the generated addition signal, for an RF signal component corresponding to a recording pit, which is contained in the second read signal.

3. The pre-pit detecting apparatus according to claim 1, wherein said amplitude correcting circuit further comprises an offset adjusting device that makes the neutral points of the first and second amplitude correcting devices coincide with each other.

4. The pre-pit detecting apparatus according to claim 1, wherein said amplitude correcting circuit further comprises an addition-signal amplitude fluctuation-correcting device that corrects fluctuations in amplitude of the addition signal on the basis of whether the pit length of a recording pit carried with the addition signal is long or short.

5. The pre-pit detecting apparatus according to claim 4, wherein said amplitude correcting circuit further comprises:
a first read signal delaying device that corrects phase shift between the addition signal and the first read signal, the phase shift produced as a result of correcting the fluctuations in amplitude of the addition signal by said addition-signal amplitude fluctuation-correcting device; and
said second read signal delaying device that corrects phase shift between the addition signal and the second read signal, the phase shift produced as a result of correcting means correcting the fluctuations in amplitude of the addition signal by said addition-signal amplitude fluctuation-correcting device.

6. The pre-pit detecting apparatus according to claim 1, wherein said amplitude correcting circuit further comprises an addition-signal nonlinear amplification device that amplifies the addition signal to make the amplification factor for one polarity of the addition signal larger than the amplification factor for the other polarity.

* * * * *